April 10, 1956     H. A. ORTEGREN     2,741,481

ROTARY MAGNETIC CHUCK

Filed June 14, 1954     3 Sheets-Sheet 1

INVENTOR.
Herman A. Ortegren
BY Barthel + Bugbee
Attys

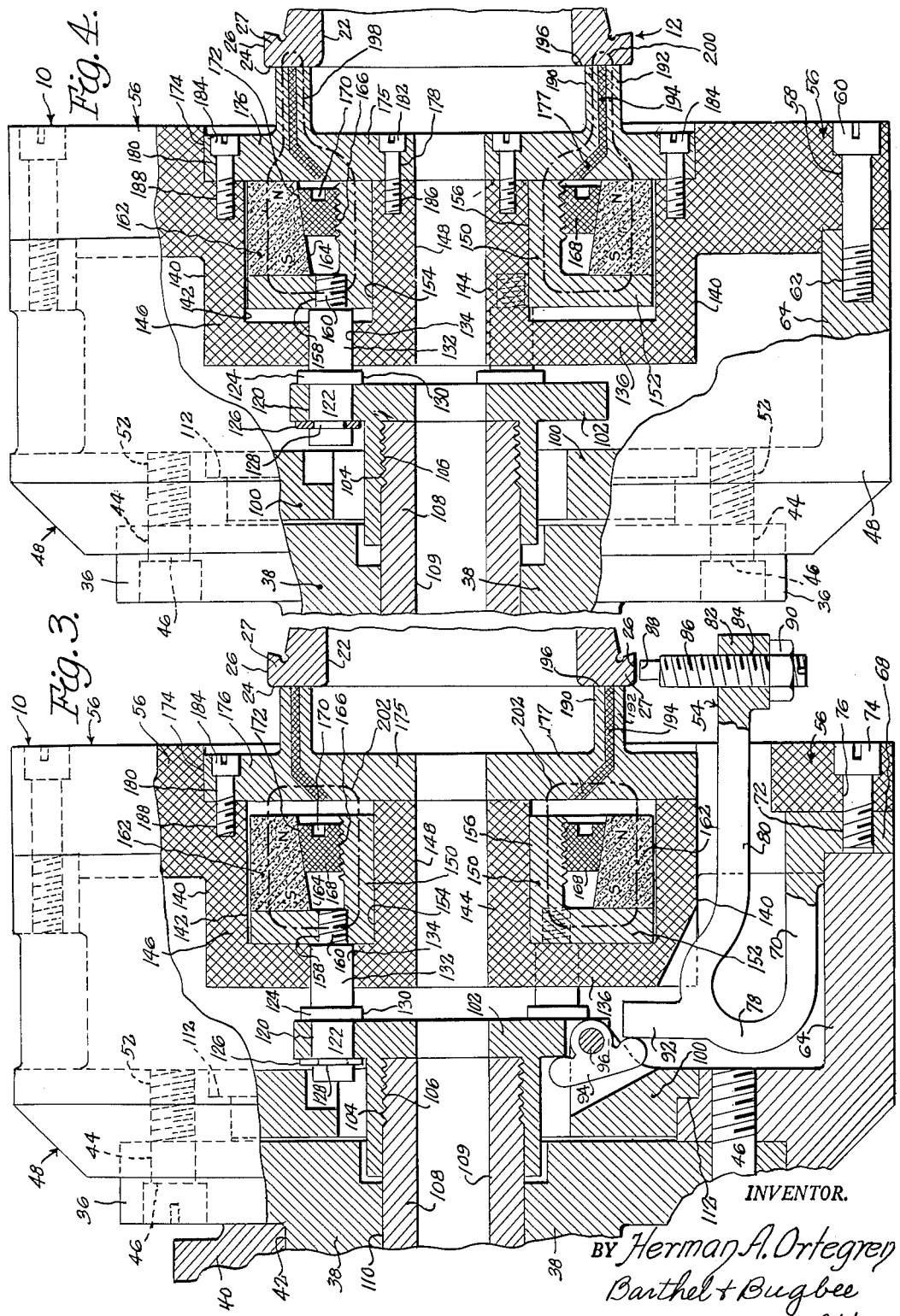

April 10, 1956  H. A. ORTEGREN  2,741,481
ROTARY MAGNETIC CHUCK
Filed June 14, 1954  3 Sheets-Sheet 3
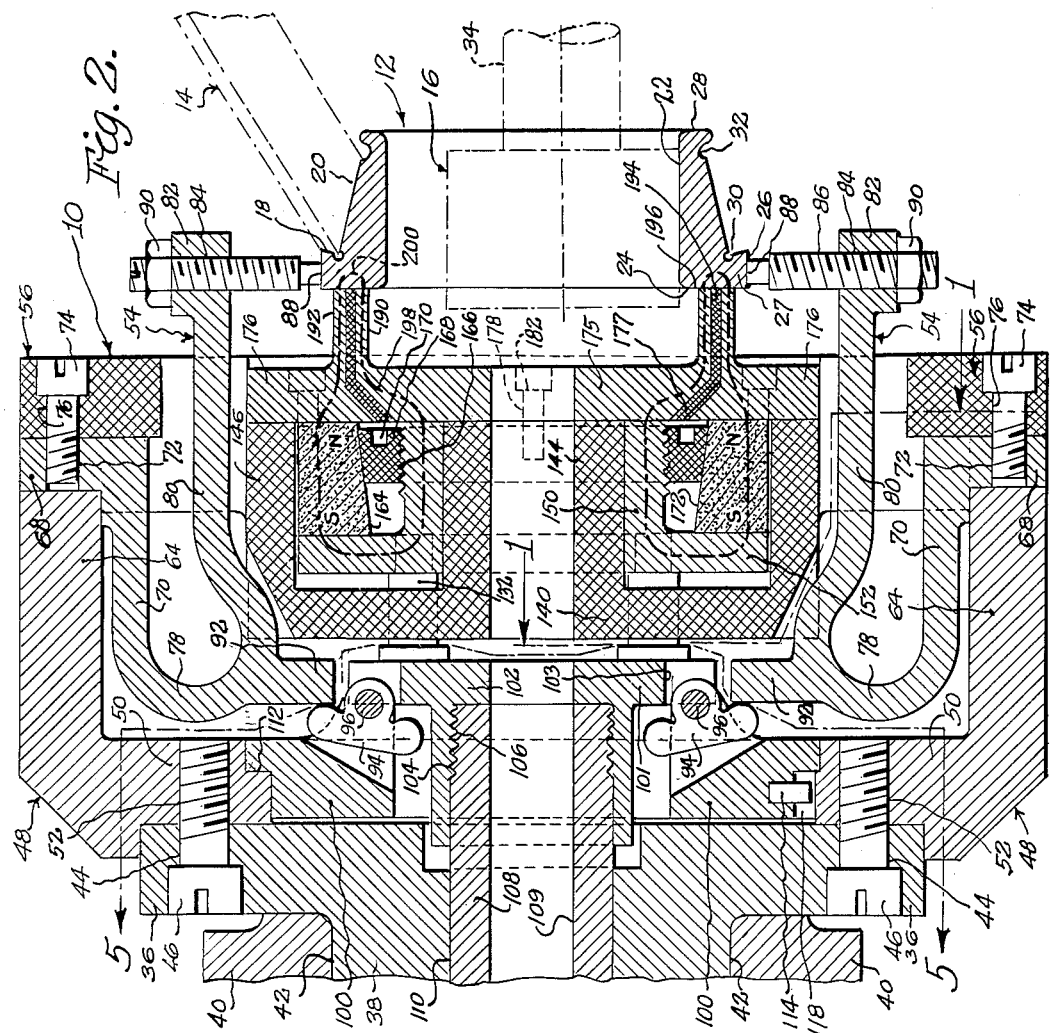
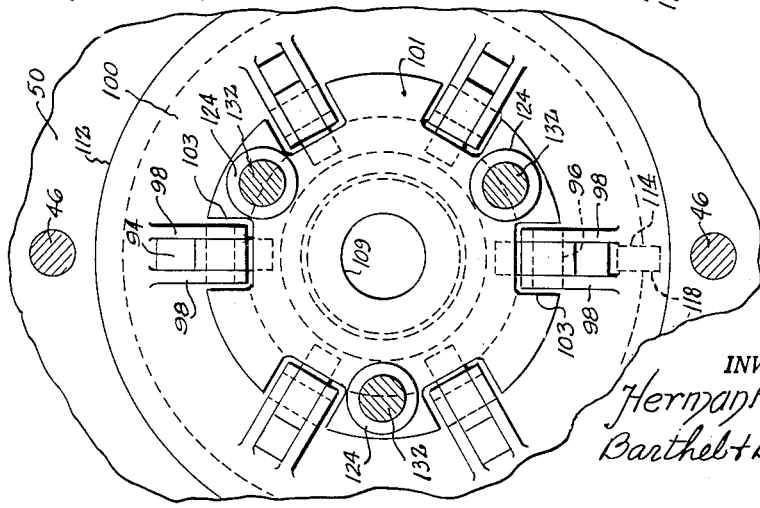
INVENTOR.
Herman A. Ortegren
Barthel + Bugbee
Attys

United States Patent Office 2,741,481
Patented Apr. 10, 1956

2,741,481

ROTARY MAGNETIC CHUCK

Herman A. Ortegren, Grosse Pointe, Mich., assignor, by mesne assignments, to Federal-Mogul-Bower Bearings, Inc., Detroit, Mich., a corporation of Michigan Application June 14, 1954, Serial No. 436,609

19 Claims. (Cl. 279—1)

This invention relates to chucks, and in particular, to rotary chucks for holding articles to be rotated while being machined.

One object of this invention is to provide a rotary chuck which will hold annular workpieces in a position permitting machining of both their external and internal surfaces either separately or simultaneously without interference from parts of the chuck.

Another object is to provide a rotary chuck of the foregoing character which is especially adapted for holding annular workpieces of magnetic material by means of magnetic force exerted by a magnet or magnets against the rearward face of the workpiece.

Another object is to provide a rotary chuck of the foregoing character wherein the workpiece to be machined is held in the chuck against a backing member or abutment by the magnetic field created by a movable magnet, the workpiece being released from the chuck by retracting the magnet from close proximity to the workpiece and creating a gap in the magnetic field which interrupts the magnetic flux.

Another object is to provide a rotary chuck of the foregoing character which is additionally provided with means for automatically centering the annular workpiece while it is pulled against the magnetized back plate by the magnetic flux from the magnet.

Another object is to provide a rotary chuck of the character set forth in the object immediately preceding, wherein centering is accomplished by means of centering arms carrying centering fingers or pins which are automatically brought into centering contact with the annular workpiece as the magnet is brought into closer proximity to the workpiece to close the path of magnetic flux through the magnetic backing plate or abutment.

Other objects and advantages of the invention will become apparent during the course of the following description of the accompanying drawings, wherein:

Figure 2 is a central vertical section taken along the line 2—2 in Figure 1, with external and internal grinding wheels shown in dotted lines, with the centering jaws in engagement with the workpiece, and with the magnet advanced so as to place the magnetic flux path in closed circuit;

Figure 3 is a generally vertical section, taken along the partly vertical and partly inclined line 3—3 in Figure 1, with the centering arms disengaged from the workpiece and with the magnet retracted so as to place the magnetic flux path in open circuit;

Figure 4 is an inclined almost vertical section taken along the inclined line 4—4 in Figure 1, with the magnet advanced so as to place the magnetic flux path in closed circuit;

Figure 5 is a vertical section through the magnet moving and centering-arm-operating mechanism taken along the line 5—5 in Figure 2.

Figure 1:
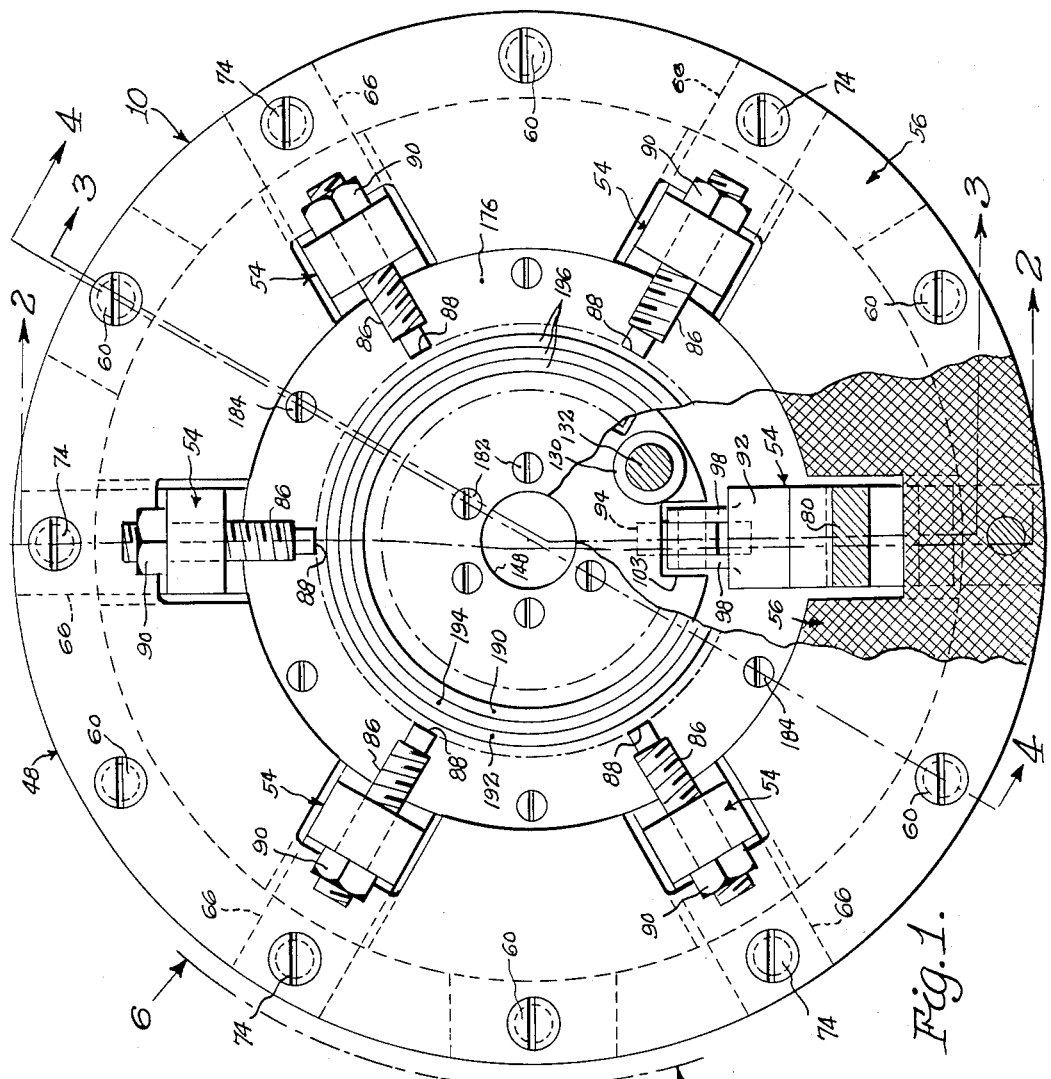
Figure 1 is a front elevation, partly in vertical section along the line 1—1 in Figure 2, showing a rotary magnetic chuck for holding annular workpieces while being machined, according to one form of the invention.
Figure 6:
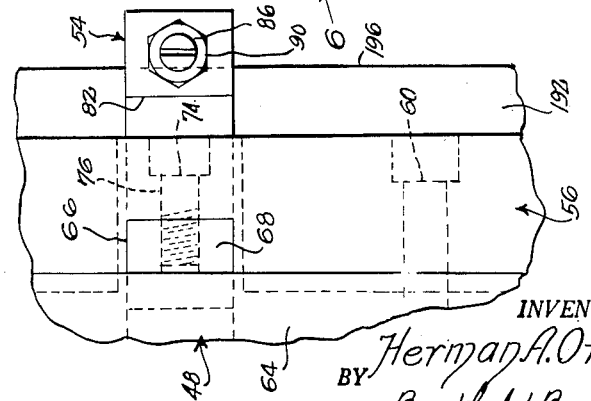
Figure 6 is a fragmentary developed side elevation taken along the arcuate line 6—6 in Figure 1.

Hitherto, in machining annular workpieces having outer and inner surfaces to be machined, such as by grinding, it has been difficult to hold the workpieces securely while they are being machined, especially where the outer and inner surfaces are to be machined simultaneously. In prior machines for centerless grinding of workpieces of annular shape, for example, the external and internal grinding operations have usually been performed on separate machines and in sequence rather than simultaneously.

The rotary chuck of the present invention provides means for holding annular magnetizable workpieces firmly and solidly against a precisely-shaped backing ring or plate by means of magnetic force created by a magnet, automatic means being also provided for centering the workpiece and gripping it with the magnetic chuck. Another feature of the invention lies in the fact that the magnetizable workpiece is held against the magnetizable backing ring by magnetic force so long as the magnet itself is maintained in closed circuit with the backing plate. However, the magnet is on a reciprocating mount by which it can be retracted from contact with the magnetic holding ring, backing plate or abutment plate in order to interrupt the path of magnetic flux so as to enable the workpiece either to be centered before machining or expelled after machining.

Referring to the drawings in detail, Figures 1 to 6 inclusive show a rotary magnetic chuck, generally designated 10, for holding magnetizable workpieces, generally designated 12, while they are being subjected to external and internal machining tools 14 and 16 respectively, the tools shown being external and internal grinding wheels operating upon the external surfaces 18 and 20 and on the internal surface 22 respectively. The workpiece 12 has a rear surface 24 by which it is mounted accurately in the chuck 10 in the manner described below, and an external peripheral cylindrical surface 26 located on an annular enlargement or flange 27 adjacent the shoulder surface 18 and serving the purpose of enabling the workpiece 12 to be accurately centered in the chuck 10, also as described below. The front surface 28 of the workpiece 12 takes no part in the chucking operation, nor do the two grooves 30 and 32 on opposite edges of the external surface 20, which in the example shown is a conical surface. The workpiece 12, as shown for purposes of illustration, is the inner race or "cone" of a tapered roller bearing, but obviously this is only one of innumerable types of workpieces which can be used in the chuck 10.

The external grinding wheel 14 is mounted on the usual shaft (not shown because it falls beyond the limits of the drawing) and the internal grinding wheel 16 is similarly mounted upon a shaft 34. The grinding wheels 14 and 16 and the chuck 10 may be mounted in any suitable conventional grinding machine, whether of the chucking type or of the centerless type. As shown in Figure 2, the chuck 10 is secured to the enlarged or flanged portion 36 of a tubular shaft 38 which is journaled in a bearing mount or support 40 having a bore 42 rotatably receiving the shaft 38. The flange or head 36 is drilled and counterbored at circumferentially-spaced intervals with holes 44 receiving screws 46 by which the chuck 10 is secured to the shaft 38. For this purpose, the chuck 10 is provided with a supporting structure including a hollow cylindrical housing 48 having an inwardly-extending flange 50 which is provided with circumferentially-spaced threaded holes 52 aligned with the holes 44 and receiving the threaded portions of the screws 46.

In order to center the workpiece 12 in the chuck 10 prior to clamping it in position, the chuck 10 is provided with multiple centering devices, generally designated 54, located at circumferentially-spaced locations around the inner periphery of the housing 48. The centering devices 54 are mounted upon a disc 56, of non-magnetic material such as brass, which is drilled at circumferentially-spaced locations 58 (Figure 4) to receive screws 60 engaging correspondingly-spaced threaded holes 62 in the rim 64 of the housing 48. The rearward face of the disc 56 at the periphery thereof is provided with circumferentially spaced rectangular notches 66 (Figure 6) serving to receive and hold the upstanding lugs 68 on the outer arm 70 of the centering devices 54. The upstanding lugs 68 are drilled and threaded as at 72 to receive the inner ends of screws 74 inserted through circumferentially-spaced holes 76 in the periphery of the disc 56. The screws 74 by which the centering devices 54 are secured to the disc 56 alternate in circumferential sequence with the screws 60 by which the disc 56 is secured directly to the housing 48 (Figure 1). By this construction, the assembly consisting of the disc 56 and centering devices 54 can be removed as a unit from the housing 48 without disturbing any of the individual centering devices 54 or altering their adjustments.

Each centering device 54, in addition to the outer arm 70 and its upstanding or radially projecting portion 68, also has a loop or bridge portion 78 (Figure 20) connecting the outer arm 70 to an inner substantially parallel arm 80 which is longer than the outer arm 70 and which therefore at its forward end projects outwardly beyond the disc 56. At its forward end, the inner arm 80 has an enlargement 82 which is drilled and threaded radially as at 84 to receive similarly-threaded centering studs 86 having accurately-machined contact ends 88 adapted to engage the peripheral centering surface 26 of the workpiece 12. A lock nut 90 holds each stud 86 in its adjusted position. Adjacent the loop 78 at its junction with the inner arm 70 each centering device 54 is provided with an inwardly-projecting lug 92 substantially parallel to the outwardly projecting lug 68 at the end of the outer arm 70 (Figure 2). The centering device 54 is made of resilient material, such as steel, so that the arms 80 will exert a spring effect, causing the studs 86 to push the workpiece 12 into concentricity with the axis of rotation of the shaft 38, as explained below.

The centering devices 54 are operated to swing the inner arms 80 outward out of centering engagement with the workpieces 12 by T-shaped rocking levers 94 (Figures 2 and 5) drilled to receive pivot pins 96, the opposite ends of which are supported in spaced parallel ears 98 projecting forwardly from an inner ring 100 and similarly drilled to receive the opposite ends of the pivot pin 96. The outer arm of each T-shaped lever 94 engages the inner lug 92 (Figure 2) whereas the inner arm thereof lies in the path of a flange 101 on a collar or sleeve 102. The flange 101 is notched at 103 to provide clearance for the ears 98. The sleeve 102 is threaded as at 104 upon the correspondingly-threaded portion 106 of a tubular reciprocable shaft or rod 108, the latter having a central bore 109 and being reciprocably mounted in a central bore 110 in the rotary tabular shaft 38. The inner ring 100 is secured in any suitable way to the inwardly-extending flange 50 of the housing 48 (Figure 2) with a stepped annular junction therebetween, as at 112, and is prevented from rotating by a pin or other key 114 seated in a socket or recess 116 in the ring 100 and engaging a keyway or groove 118 in the flange 50 disposed parallel to the axis of rotation of the tubular shaft 38.

The flanged sleeve 102 is provided with circumferentially-spaced bores 120 (Figures 3 and 4) to receive the rearward ends 122 of pins 124 secured in position by split rings 126 in grooves 128 and flanged as at 130 to provide rigidity. The forward portions 132 of the pins 124 pass slidably through bores 134 in the rearward or bottom wall 136 of a cup-shaped portion 140 in the center of the disc 56. The cup-shaped central portion 140 has an annular recess 142 therein surrounded by inner and outer walls 144 and 146 respectively, the inner walls having a central bore 148 therein aligned with the bore 109 in the tubular shaft or rod 108.

Reciprocably mounted in the annular recess 142 is a sleeve 150 having at its rearward end a flange 152, the length of the sleeve 150 being less than the axial length of the annular recess 142 so as to permit clearance for axial sliding motion (Figures 3 and 4). The sleeve 150 is provided with a central bore 154 which receives the inner wall 144 and slides upon the cylindrical outer surface 156 thereof. The flange 152 is provided with circumferentially-spaced threaded bores 158 aligned with the reduced diameter threaded ends 160 of the pins 124 and threadedly receiving them. Thus, when the tubular rod or shaft 108 is reciprocated, it carries with it the pins 124 and the flanged sleeve 150 connected thereto.

Mounted in the space between the sleeve 150 and its flange 152 (Figures 2, 3 and 4) and slidable as a unit therewith axially along the annular recess 142 is an approximately annular magnet 162 of generally hollow cylindrical shape except that it has a tapered or conical central bore 164. The magnet 162 is preferably a permanent magnet, such as of aluminum-nickel-cobalt alloy.

The outer surface of the sleeve 150 at the end opposite its flange 152 is threaded as at 166 to receive a correspondingly-threaded retaining ring 168. The retaining ring 168 is preferably of brass or other non-magnetic material with spanner sockets 170 therein for receiving a spanner or other wrench, and having a tapered outer surface 172 fitting the tapered central bore 164 of the magnet 162. Consequently, as the ring 168 is threaded upon the threaded portion 166 of the sleeve 150, it urges the magnet 162 tightly into clamped engagement with the flange 152 on the sleeve 150, as well as centering it at the same time upon the sleeve 150.

Secured within an annular recess 174 in the front of the disc 56 concentric with the annular recess 142 therein is an annular abutment consisting of inner and outer annular abutment members 175 and 176 magnetically separated from one another by an annular non-ferrous metal sleeve 177 of brass or other suitable material and bored at circumferentially-spaced intervals with inner and outer sets of holes 178 and 180 respectively (Figure 4) to receive inner and outer sets of screws 182 and 184. The screws 182 and 184 are threaded respectively into inner and outer sets of holes 186 and 188 in the disc 56 at the bottom of the recess 174.

Integral with and projecting forwardly from the inner and outer abutment members 175 and 176 respectively are annular inner and outer work-engaging portions 190 and 192 respectively, spaced radially apart from one another by the forward portion 194 of the non-magnetic spacing sleeve 177, the rearward portion of which is approximately conical in shape, to fit the corresponding adjacent portions of the rings 175 and 176. The outer or forward ends of the projecting portions 190 and 192 and the spacing portion 194 have a common end or abutment surface 196 which is ground to precisely flat form and radical direction so as to accurately fit the rear surfaces 24 of the workpieces 12 and permit sliding motion therebetween. The discs 175 and 176 as well as the flanged sleeve 150 are of ferrous metal or other magnetic material so as to provide a continuous magnetic flux path indicated by the heavy chain line 198 within the chuck 10 and its continuation 200 within the workpiece 12. The disc 56, including its cup-shaped central portion 140, is made of non-magnetic material such as brass. As will be seen in connection with the operation, the magnetic flux flows through the workpiece 12 with sufficient force for clamping purposes only when the magnet 162 is in its advanced position (Figures 2 and 4) and becomes too weak for clamping purposes or for all practical purposes ceases to flow through the workpiece 12 when the magnet 162 is in its retracted position (Figure 3). The magnetic flux path in the latter instance is indicated by the heavy chain line 202 (Figure 3) which does not extend outward through the annular projections 190 and 192 and lacks the extension 200 within the workpiece 12.

*Operation*

In the operation of the invention, let it be assumed for purposes of illustration that the chuck 10 has been mounted in any suitable grinding machine either of the centerless or chucking type. Let it also be assumed that the machine includes a pneumatic or hydraulic piston and cylinder arrangement for reciprocating the hollow shaft or tubular rod 108.

Let it be assumed that a supply of workpieces 12 to be ground has been provided, ready to be inserted in the chuck 10 and that the machine has been set up with the external and internal grinding wheels 14 and 16 retracted for insertion of the workpieces. Let it also be assumed that the flanged sleeve 102, magnet 162, tubular rod 108 and flanged sleeve 102 are in their retracted positions (Figure 3) so that there is very little magnetic flux, if any, flowing through the annular projecting portions 190 and 192 of the inner and outer annular abutment members 175 and 176. The retraction of the flanged sleeve 102 (Figure 3) also rocks the T-shaped rocking levers 102 about their pivot pins 96 so as to cause the outer arms thereof to be forcibly pushed against the inner lugs 92 of the centering devices 54, forcing their inner arms 80 outward by a bellcrank action. This action causes the ends 88 of the centering studs 86 to be moved radially outward so that they lie on a diameter which is greater than the external diameter of the outer peripheral surface 26 on the flange 27 of the workpiece 12. As a consequence, it is possible at this time to insert a workpiece 12 in the temporarily-enlarged circular space provided by the outward motion of the centering studs 86.

The hollow shaft or tubular rod 108 and its flanged sleeve 102 and magnet 162 are now moved forward by the fluid pressure piston (not shown), releasing the rocking levers 94 so that their outer arms are pushed backward by the resilience of the centering devices 54, permitting their inner arms 80 and centering screws 86 to move inward, centering the workpiece 12 relatively to the annular abutment surface 196. The same action causes the assembly of the magnet 162, flanged sleeve 150 and retaining ring 168 to move bodily forward from the position of Figure 3 to the position of Figure 4 until the flanged sleeve 150 and the magnet 162 mounted therein engage the inner surfaces of the inner and outer annular abutment members 175 and 176 respectively. With contact thus made between these elements, a magnetic flux path 198 is established with its extension 200 passing into the workpiece 12, firmly clamping the now centered workpiece magnetically against the abutment surface 196. The grinding wheels 14 and 16 on their mounts (not shown) are then brought into engagement with the inner and outer surfaces 22 and 20 to be ground while the workpiece 12 is rotated, accurately grinding the surfaces 22 and 20. While grinding is taking place, the workpiece 12 is held in its centered position by the magnetic flux following the path 198, 200 in the chuck 10 and workpiece 12 respectively.

What I claim is:

1. A rotary chuck for holding a hollow workpiece of magnetically-attracted material for internal and external machining thereof, said chuck comprising a rotary supporting structure adapted to be rotatably connected to a rotating member, an annular abutment of magnetizable material mounted on said supporting structure coaxial with the axis of rotation thereof, said abutment projecting forwardly from said structure, a magnet movably mounted within said structure for travel into and out of engagement for starting and stopping the magnetic flux therethrough from said magnet into a magnetically-attracted workpiece contacting said abutment, and means for moving said magnet into and out of engagement with said abutment.

2. A rotary chuck for holding a hollow workpiece of magnetically-attracted material for internal and external machining thereof, said chuck comprising a rotary supporting structure adapted to be rotatably connected to a rotating member, an annular abutment of magnetizable material mounted on said supporting structure coaxial with the axis of rotation thereof, a magnet movably mounted within said structure for travel into and out of engagement with said abutment for starting and stopping the magnetic flux therethrough from said magnet into a magnetically-attracted workpiece contacting said abutment, means for moving said magnet into and out of engagement with said abutment, and a plurality of workpiece centering devices mounted on said structure outwardly and forwardly of said abutment.

3. A rotary chuck for holding a hollow workpiece of magnetically-attracted material for internal and external machining thereof, said chuck comprising a rotary supporting structure adapted to be rotatably connected to a rotating member, an annular abutment of magnetizable material mounted on said supporting structure coaxial with the axis of rotation thereof, a magnet movably mounted within said structure for travel into and out of engagement with said abutment for starting and stopping the magnetic flux therethrough from said magnet into a magnetically-attracted workpiece contacting said abutment, means for moving said magnet into and out of engagement with said abutment, and a plurality of workpiece centering devices mounted on said structure outwardly and forwardly of said abutment for motion substantially radially toward and away from a workpiece engaging said abutment.

4. A rotary chuck for holding a hollow workpiece of magnetically-attracted material for internal and external machining thereof, said chuck comprising a rotary supporting structure adapted to be rotatably connected to a rotating member, an annular abutment of magnetizable material mounted on said supporting structure coaxial with the axis of rotation thereof, a magnet movably mounted within said structure for travel into and out of engagement with said abutment for starting and stopping the magnetic flux therethrough from said magnet into a magnetically-attracted workpiece contacting said abutment, means for moving said magnet into and out of engagement with said abutment, a plurality of workpiece centering devices mounted on said structure outwardly and forwardly of said abutment for motion substantially radially toward and away from a workpiece engaging said abutment, and mechanism responsive to the retraction of said magnet from engagement with said abutment for moving said centering devices outwardly away from said workpiece while said workpiece is engaging said abutment.

5. A rotary chuck for holding a hollow workpiece of magnetically-attracted material for internal and external machining thereof, said chuck comprising a rotary supporting structure adapted to be rotatably connected to a rotating member, an annular abutment of magnetizable material mounted on said supporting structure coaxial with the axis of rotation thereof, a magnet movably mounted within said structure for travel into and out of engagement with said abutment for starting and stopping the magnetic flux therethrough from said magnet into a magnetically-attracted workpiece contacting said abutment, means for moving said magnet into and out of engagement with said abutment, a plurality of workpiece centering devices mounted on said structure outwardly and forwardly of said abutment for motion substantially radially toward and away from a workpiece engaging said abutment, and mechanism responsive to the retraction of said magnet from engagement with said abutment for moving said centering devices outwardly away from said workpiece while said workpiece is engaging said abutment, said mechanism including levers pivotally mounted on said structure and operatively connecting said centering devices to said magnet-moving means.

6. A rotary chuck for holding a hollow workpiece of magnetically-attracted material for internal and external machining thereof, said chuck comprising a rotary supporting structure adapted to be rotatably connected to a rotating member, an annular abutment of magnetizable material mounted on said supporting structure coaxial with the axis of rotation thereof, a magnet movably mounted within said structure for travel into and out of engagement with said abutment for starting and stopping the magnetic flux therethrough from said magnet into a magnetically-attracted workpiece contacting said abutment, means for moving said magnet into and out of engagement with said abutment, and a plurality of workpiece centering devices including centering arms pivotally mounted on said structure outwardly and forwardly of said abutment for motion substantially radially toward and away from a workpiece engaging said abutment.

7. A rotary chuck for holding a hollow workpiece of magnetically-attracted material for internal and external machining thereof, said chuck comprising a rotary supporting structure adapted to be rotatably connected to a rotating member, an annular abutment of magnetizable material mounted on said supporting structure coaxial with the axis of rotation thereof, a magnet movably mounted within said structure for travel into and out of engagement with said abutment for starting and stopping the magnetic flux therethrough from said magnet into a magnetically-attracted workpiece contacting said abutment, means for moving said magnet into and out of engagement with said abutment, a plurality of workpiece centering devices including centering arms pivotally mounted on said structure outwardly and forwardly of said abutment for motion substantially radially toward and away from a workpiece engaging said abutment, and mechanism responsive to the retraction of said magnet from engagement with said abutment for moving said centering arms outwardly away from said workpiece while said workpiece is engaging said abutment.

8. A rotary chuck for holding a hollow workpiece of magnetically-attracted material for internal and external machining thereof, said chuck comprising a rotary supporting structure adapted to be rotatably connected to a rotating member, an annular abutment of magnetizable material mounted on said supporting structure coaxial with the axis of rotation thereof, a magnet movably mounted within said structure for travel into and out of engagement with said abutment for starting and stopping the magnetic flux therethrough from said magnet into a magnetically-attracted workpiece contacting said abutment, means for moving said magnet into and out of engagement with said abutment, a plurality of workpiece centering devices including centering arms pivotally mounted on said structure outwardly and forwardly of said abutment for motion substantially radially toward and away from a workpiece engaging said abutment, and mechanism responsive to the retraction of said magnet from engagement with said abutment for moving said centering arms outwardly away from said workpiece while said workpiece is engaging said abutment, said mechanism including levers pivotally mounted on said structure and operatively connecting said centering arms to said magnet-moving means.

9. A rotary chuck for holding a hollow workpiece of magnetically-attracted material for internal and external machining thereof, said chuck comprising a rotary supporting structure adapted to be rotatably connected to a rotating member, an annular abutment of magnetizable material mounted on said supporting structure coaxial with the axis of rotation thereof, a magnet movably mounted within said structure for travel into and out of engagement with said abutment for starting and stopping the magnetic flux therethrough from said magnet into a magnetically-attracted workpiece contacting said abutment, and means including a reciprocating plunger connected to said magnet for moving said magnet into and out of engagement with said abutment.

10. A rotary chuck for holding a hollow workpiece of magnetically-attracted material for internal and external machining thereof, said chuck comprising a rotary supporting structure adapted to be rotatably connected to a rotating member, an annular abutment of magnetizable material mounted on said supporting structure coaxial with the axis of rotation thereof, said abutment projecting forwardly from said structure, a magnet movably mounted within said structure for travel into and out of engagement with said abutment for starting and stopping the magnetic flux therethrough from said magnet into a magnetically-attracted workpiece contacting said abutment, and means for moving said magnet into and out of engagement with said abutment, said abutment including spaced inner and outer members of magnetizable material disposed closely adjacent one another, and a spacer of non-magnetic material disposed in the space between said members.

11. A rotary chuck for holding a hollow workpiece of magnetically-attracted material for internal and external machining thereof, said chuck comprising a rotary supporting structure adapted to be rotatably connected to a rotating member, an annular abutment of magnetizable material mounted on said supporting structure coaxial with the axis of rotation thereof, a magnet movably mounted within said structure for travel into and out of engagement with said abutment for starting and stopping the magnetic flux therethrough from said magnet into a magnetically-attracted workpiece contacting said abutment, and means for moving said magnet into and out of engagement with said abutment, said abutment including spaced inner and outer members of magnetizable material disposed closely adjacent one another and projecting forwardly from said structure, and a spacer of non-magnetic material disposed in the space between said members.

12. A rotary chuck for holding a hollow workpiece of magnetically-attracted material for internal and external machining thereof, said chuck comprising a rotary supporting structure adapted to be rotatably connected to a rotating member, an annular abutment of magnetizable material mounted on said supporting structure coaxial with the axis of rotation thereof, said abutment projecting forwardly from said structure, a magnet movably mounted within said structure for travel into and out of engagement with said abutment for starting and stopping the magnetic flux therethrough from said magnet into a magnetically-attracted workpiece contacting said abutment, and means for moving said magnet into and out of engagement with said abutment, said abutment including spaced annular concentric inner and outer members of magnetizable material disposed closely adjacent one another, and a spacer of non-magnetic material disposed in the space between said members.

13. A rotary chuck for holding a hollow workpiece of magnetically-attracted material for internal and external machining thereof, said chuck comprising a rotary supporting structure adapted to be rotatably connected to a rotating member, an annular abutment of magnetizable material mounted on said supporting structure coaxial with the axis of rotation thereof, a magnet movably mounted within said structure for travel into and out of engagement with said abutment for starting and stopping the magnetic flux therethrough from said magnet into a magnetically-attracted workpiece contacting said abutment, and means for moving said magnet into and out of engagement with said abutment, said abutment including spaced annular concentric inner and outer members of magnetizable material disposed closely adjacent one another and projecting forwardly from said structure, and a spacer of non-magnetic material disposed in the space between said members.

14. A rotary chuck for holding a hollow workpiece of magnetically-attracted material for internal and external machining thereof, said chuck comprising a rotary supporting structure adapted to be rotatably connected to a rotating member, an annular abutment of magnetizable material mounted on said supporting structure coaxial with the axis of rotation thereof, said abutment projecting forwardly from said structure, a magnet movably mounted within said structure for travel into and out of engagement with said abutment for starting and stopping the magnetic flux therethrough from said magnet into a magnetically-attracted workpiece contacting said abutment, and means for moving said magnet into and out of engagement with said abutment, said abutment including spaced annular concentric inner and outer members of magnetizable material disposed closely adjacent one another, and an annular spacer of non-magnetic material disposed concentric with said annular concentric inner and outer members in the space between said members.

15. A rotary chuck for holding a hollow workpiece of magnetically-attracted material for internal and external machining thereof, said chuck comprising a rotary supporting structure adapted to be rotatably connected to a rotating member, an annular abutment of magnetizable material mounted on said supporting structure coaxial with the axis of rotation thereof, a magnet movably mounted within said structure for travel into and out of engagement with said abutment for starting and stopping the magnetic flux therethrough from said magnet into a magnetically-attracted workpiece contacting said abutment, and means for moving said magnet into and out of engagement with said abutment, said abutment including spaced annular concentric inner and outer members of magnetizable material disposed closely adjacent one another and projecting forwardly from said structure, and an annular spacer of non-magnetic material disposed concentric with said annular concentric inner and outer members in the space between said members.

16. A rotary chuck for holding a hollow workpiece of magnetically-attracted material for internal and external machining thereof, said chuck comprising a rotary supporting structure adapted to be rotatably connected to a rotating member, an annular abutment of magnetizable material mounted on said supporting structure coaxial with the axis of rotation thereof, a magnet of annular shape coaxial with said abutment movably mounted within said structure for travel into and out of engagement with said abutment for starting and stopping the magnetic flux therethrough from said magnet into a magnetically-attracted workpiece contacting said abutment, and means for moving said magnet into and out of engagement with said abutment.

17. A rotary chuck for holding a hollow workpiece of magnetically-attracted material for internal and external machining thereof, said chuck comprising a rotary supporting structure adapted to be rotatably connected to a rotating member, an annular abutment of magnetizable material mounted on said supporting structure coaxial with the axis of rotation thereof, a magnet movably mounted within said structure for travel into and out of engagement with said abutment for starting and stopping the magnetic flux therethrough from said magnet into a magnetically-attracted workpiece contacting said abutment, means for moving said magnet into and out of engagement with said abutment, and a plurality of workpiece centering devices including approximately U-shaped spring elements mounted on said structure, each spring element including a pair of arms, one arm of each pair projecting outwardly and forwardly of said abutment.

18. A rotary chuck for holding a hollow workpiece of magnetically-attracted material for internal and external machining thereof, said chuck comprising a rotary supporting structure adapted to be rotatably connected to a rotating member, an annular abutment of magnetizable material mounted on said supporting structure coaxial with the axis of rotation thereof, a magnet movably mounted within said structure for travel into and out of engagement with said abutment for starting and stopping the magnetic flux therethrough from said magnet into a magnetically-attracted workpiece contacting said abutment, means for moving said magnet into and out of engagement wtih said abutment, a plurality of workpiece centering devices mounted on said structure outwardly and forwardly of said abutment for motion substantially radially toward and away from a workpiece engaging said abutment, and sequentially-operative mechanism responsive to the advancement of said magnet toward said abutment for moving said centering devices inward toward said abutment prior to the arrival of said magnet at said abutment.

19. A rotary chuck for holding a hollow workpiece of magnetically-attracted material for internal and external machining thereof, said chuck comprising a rotary supporting structure adapted to be rotatably connected to a rotating member, an annular abutment of magnetizable material mounted on said supporting structure coaxial with the axis of rotation thereof, a magnet movably mounted within said structure for travel into and out of engagement with said abutment for starting and stopping the magnetic flux therethrough from said magnet into a magnetically-attracted workpiece contacting said abutment, means for moving said magnet into and out of engagement with said abutment, a plurality of workpiece centering devices mounted on said structure outwardly and forwardly of said abutment for motion substantially radially toward and away from a workpiece engaging said abutment, and sequentially-operative mechanism responsive to the advancement of said magnet toward said abutment for moving said centering devices inward toward said abutment prior to the arrival of said magnet at said abutment, said mechanism including levers pivotally mounted on said structure and operatively connecting said centering devices to said magnet-moving means.

References Cited in the file of this patent

UNITED STATES PATENTS

| 1,816,888 | Arter et al. | Aug. 4, 1931 |
| 2,179,625 | Groden | Nov. 14, 1939 |